3,325,494
PROCESS FOR PREPARING PYRAZINAMIDO-
GUANIDINES
Leonard M. Weinstock, Rocky Hill, N.J., and Edward J. Cragoe, Jr., Lansdale, Pa., assignors to Merck & Co., Inc., Rahway, N.J., a corporation of New Jersey
No Drawing. Filed Mar. 31, 1964, Ser. No. 356,041
7 Claims. (Cl. 260—250)

This invention relates to a method for the preparation of pyrazinamidoguanidine compounds from pyrazinoic acid hydrazides by reaction with a cyanamide compound.

Acylaminoguanidines have been prepared by the reaction of the alkyl esters of organic acids with aminoguanidines, and also by the reaction of organic acid hydrazides with 2-methyl-2-thiopeudourea. Both of these methods result in relatively low yields, and considerable quantities of cyclized by-product may be produced. Starting with some heterocyclic acid hydrazides, only the cylized products are produced, or can be recovered as products of the reaction. Moreover, both methods utilize expensive reactants.

It has been discovered that, starting with a pyrazinoic acid hydrazide, the pyrazinamidoguanidine is readily produced in high yield by reaction with a cyanamide. This reaction can be chemically represented as follows:

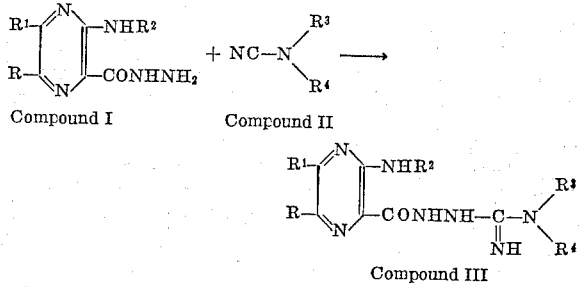

wherein in each of the above structures

R can be hydrogen, lower allkyl, lower cycloalkyl, mononuclear-aryl, or a halogen substituent such as chlorine, bromine, iodine, or a trihalomethyl radical, the latter including for example, trifluoromethyl and trichloromethyl radicals.

$R^1$ can be hydrogen or an amino group, such as an animo group of the formula

wherein $R^5$ can be hydrogen or a lower alkyl radical, and $R^6$ can be
hydrogen,
lower alkoxy,
lower alkyl, either straight chain, branched chain or cyclic (3- to 6-membered rings),
phenyl-lower-alkyl, or
aryl $R^2$ can be hydrogen or acyl, for example $R^7CO$—wherein $R^7$ is hydrogen or a lower alkyl radical; and $R^3$ and $R^4$ can be similar or dissimilar radicals and each represent:
hydrogen,
lower-alkyl
phenyl-lower-alkyl,
(halo-phenyl)-lower-alkyl,
lower-(alkylphenalkyl), or
(lower-alkoxyphenyl)-lower-alkyl.

This discovery presents a simple and highly economical method of producing an important group of diuretic compounds having the structure indicated as Compound III. The process gives high yields of the pyrazinamidoguanidine without the formation of cydized by-products.

The novel compounds-(III)-prepared by the process of this invention possess natriuretic properties and may be used for the treatment of edema, hypertension, and other diseases known to be responsive to this therapy.

It is an advantage of this invention that an amino, or substituted amino group, may be present at the 3-position of the pyrazine ring without materially affecting the course of the reaction. The basicity of the amino group on the pyrazine ring is reduced to a point that renders it inert to cyanamide in this reaction. Thus success of the reaction is unexpected in that the 3-amino group in the pyrazine ring would normally be expected to react with cyanamide, thereby preventing the formation of the desired product.

In this reaction, mono- or disubstituted - cyanamides can be used as reactants in order to obtain the correspondingly substituted aminoguanidine derivatives.

The mono-substituted cyanamides useful for this reaction include compounds such as methyl-, ethyl- isbutyl-, n-amyl-, n-hexyl, n-heptyl-, n-octyl-, benzyl-, phenyl-, and p-chlorophenylcyanamide. These cyanamides can be prepared, for example, by treating the appropriate primary amines with cyanogen bromide in an organic solvent such as ether, aqueous alcohol or ethyl acetate.

Examples of suitable disubstituted cyanamides include dimethyl-, diethyl-, diisopropyl-, di-n-butyl-, di-n-amyl-, di(p-dimethylaminophenyl), benzyl-methyl-, and benzyl-ethyl-cyanamide. A number of these dialkylcyanamides are commercially available. They can be prepared, if desired, by the action of potassium cyanide and bromine on an aqueous suspension of the appropriate secondary amine, or by the direct addition of cyanogen bromide to solutions of the secondary amine.

The process of this invention is carried out under acidic conditions. Suitable acids which can be used are mineral acids such as sulfuric acid, methanesulfonic acid, benzenesulfonic acid, p-tolunesulfonic acid, hydrochloric acid, hydrobromic acid, phosphoric acid, and the like, and also organic acid such as acetic, propionic, citric, maleic and lactic acids. Conveniently, hydrochloric acid is used in order to facilitate recovery of the product directly as the insoluble hydrochloride salt. The hydrochloride salts have the added advantage that they are quite stable, even when hot.

The reaction conveniently takes place in the presence of a water soluble, inert solvent. Suitable solvents are the lower alkanols, such as methanol, ethanol and 2-propanol. Other solvents which can be used include dioxane and tetrahydrofuran. Usually, about five to ten parts of solvent are employed for each part of the hydrazide starting material. Some water is desirable in the reactants, but the amount of water should be limited so as to prevent extensive hydrolysis of the cyanamide. Generally the amount is kept at less than 20% of the weight of the solvent employed.

The reaction mixture is maintained within the pH range of about 2 to 8, and preferably within the range of about pH 3 to 5. This is necessary in order to avoid unwanted side reactions.

It is an advantage of this invention that the use of pure, crystalline cyanamide is not necessary. Commercial cyanamide, which is available as a relatively inexpensive 50% aqueous solution, also gives excellent results. Sodium cyanamide, sodium hydrogen cyanamide, calcium cyanamide, or other metal cyanamide salts can likewise be used.

The amount of cyanamide can vary, but it is preferred to use about one to about three molar equivalents. The pH of the reaction mixture may change from about two to about six during the first part of the reaction caused by partial hydrolysis of the cyanamide. In order to minimize the amount of such hydrolysis the cyanamide is added in increments over the course of the reaction.

An elevated temperature generally is employed. The reaction conveniently is carried out at the reflux temperature of the solvent, but a range of about 40° C. to about 200° C. is effective.

The time required for the reaction will vary depending on the particular pyrazinoic acid hydrazide and the particular cyanamide compound used as starting materials. The reaction time may also depend in part upon the particular solvents and temperatures employed. A spontaneous reaction may result so that the reaction product can be isolated almost immediately. Reaction is usually complete in from about one-half to six hours. However, a longer reaction time has no adverse effect upon the yield.

The product can be recovered in the form of the free base by neutralizing the acid, using a basic reagent such as an alkali metal or alkaline earth metal hydroxide, bicarbonate or carbonate. In a preferred embodiment of this invention, the product is recovered by adding an excess of ammonia to precipitate the slightly soluble free base, which is then filtered off. The product can be further purified by dissolving the base in hot alcohol containing a mineral acid, such as hydrochloric acid, treating with charcoal, or a diatomaceous earth, such as Celite, and cooling to about 10° C. to crystallize the product as the acid addition salt. This salt is recovered generally as a hydrate.

An alternate method of recovery involves adding charcoal to the hot reaction mixture and cooling to crystallize the acid addition salt directly.

Examples of pyrazinamidoguanidines which can be prepared by the method of this invention include (3,5-diamino-6-chloropyrazinamido)guanidine, (3-amino-5-isopropylamino - 6 - chloropyrazinamido)guanidine, (3,5-diamino - 6 - bromopyrazinamido)guanidine, (3-amino-5-dimethylamino - 6 - chloropyrazinamido)-guanidine, (3-aminopyrazinamido)guanidine, (3-amino-chloropyrazinamido)guanidine, (3-amino-6-bromopyrazinamido)guanidine, (3-amino - 6 - iodopyrazinamido)guanidine, 1-(3-amino - 6 - chloropyrazinamido)-3-methylguanidine, (3-amino-5-allylamino-6-chloropyrazinamido)ganidine, 1-(3-amino-6-chloropyrazinamido)-3,3-dimethylguanidine, 1-(3 - amino-6-chloropyrazinamido)-3-phenylguanidine, 1-(3-amino-6-chloropyrazinamido)-3-benzylguanidine and 1-(3-amino-6-chloropyrazinamido)-3-phenethylguanidine.

This invention is not limited, however, to the preparation of pyrazinamidoguanidines having the above named substituents, but is generally applicable to the preparation of 3-amino-pyrazinamidoguanidines having any combination of substituents, provided only that a method is available for the preparation of the requisite pyrazinoic acid hydrazide starting material, and subject to the limitation that any substituent on the pyrazine ring must be inert to cyanamide during the reaction.

The pyrazinoic acid hydrazide used as starting materials can be made by several different chemical processes and one particular process may be more useful than another for making a specific compound. One generally useful process can be represented as follows:

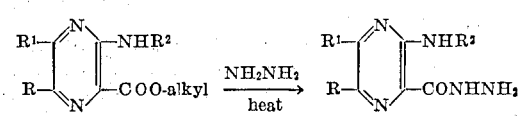

wherein R, R¹ and R² have the meaning defined above. This reaction is carried out in a conventional manner, for example, by refluxing the reactants in a solution of absolute ethanol for several hours, as is described in Example 1, Step B. The yield is approximately theoretical.

The preparation of the various pyrazinoate ester starting materials are described in Belgium Patent 623,480, to Cragoe and Southwick, issued Apr. 11, 1963, and also in co-pending U.S. applications to Cragoe, Ser. Nos. 311,291, filed Sept. 27, 1963 and 313,315, filed Oct. 7, 1963, the disclosures of which are incorporated herein by reference.

The following examples are illustrative of the method by which the products of this invention can be prepared and are not to be considered as limiting the invention to the partticular procedural conditions employed or to the particular compounds prepared thereby.

EXAMPLE 1

(3-amino-6-chloropyrazinamido)guanidine hydrochloride

Step A: Preparation of methyl 3-amino-6-chloropyrazinoate.—A 5-liter, 3-necked flask equipped with a mechanical stirrer, thermometer and gas inlet tube is charged with a warm (about 38° C.) mixture of water (3180 ml.) and glacial acetic acid (750 ml.); methyl 3-aminopyrazinotae (90 g., 0.588 mole) then is added. The stirrer is started and the mixture is heated to 41° C. which causes nearly all the ester to dissolve. The solution then is cooled to just below 40° C. via an ice bath. With vigorous stirring, chlorine (about 140 g.) is passed through the solution over a period of 25 minutes. A precipitate begins to form after five minutes and becomes voluminous by the end of the reaction. The temperature drops to 20–25° C. during the reaction. The nearly white precipitate, which is methyl 3-chloroamino-6-chloropyrazinoate, is removed by filtration and washed with a small amount of ice water. A small amount of this material, when recrystallized from warm acetic acid, melts at 142° C. (dec.).

Analysis.—Calculated for $C_6H_5Cl_2N_3O_2$: C, 32.46; H, 2.27; N, 18.93; Cl, (total) 31.94; Cl, (active) 15.97. Found: C, 32.82; H, 2.34; N, 18.90; Cl, (total) 32.09; Cl, (active) 16.06.

The moist methyl 3-chloroamino-6-chloropyrazinoate and a solution of sodium bisulfite (150 g.) in water (900 ml.) are placed in a 4-liter beaker and stirred mechanically for one-half hour. The temperature of the mixture is maintained at 25° C. by addition of ice. The light yellow methyl 3-amino-6-chloropyrazinoate is removed by filtration, suspended in 150 ml. of ice water and filtered. This process is repeated twice with 150 ml. portions of ice water and once with a 50 ml. portion of cold isopropyl alcohol. After drying in the air, there is obtained 60 g. (55%) of methyl 3-amino-6-chloropyrazinoate M.P. 159–161° C.

Analysis.—Calculated for $C_6H_6ClN_3O_2$: C, 38.42; H, 3.22; N, 22.40; Cl, 18.90. Found: C, 38.81; H, 3.54; N, 22.83; Cl, 18.39.

Step B: Preparation of 3-amino-6-chloropyrazinoic acid hydrazide.—Methyl 3-amino-6-chloropyrazinoate (94 g., 0.50 mole) and ethanol (2.2 liters) are placed in a 3 liter, round-bottom flask, fitted with a reflux condenser and refluxed on a steam bath. As soon as the ester dissolves, hydrazine (32 g., 1.0 mole) is added to the solution and refluxing is continued for 2 hours. After refluxing for about ten minutes the major portion of the product separates from the reaction mixture. At the end of the heating period the mixture is chilled to 0° C. and the product is filtered, washed well with cold ethanol, and dried, yielding 94 g. (100%) of 3-amino-6-chloropyrazinoic acid hydrazide, M.P. 218–220° C. Recrystallization from ethanol followed by sublimation gives material with little change in melting point.

Analysis.—Calculated for $C_5H_6ClN_5O$: C, 32.01; H, 3.22; N, 37.33. Found: C, 31.74; H, 2.98; N, 37.45.

Step C: Preparation of (3-amino-6-chloropyrazinamido) guanidine hydrochloride.—A mixture of 3-amino-6-chloropyrazinoic acid hydrazide (240 g., 1.28 mole) and ethanol (4 liters) is stirred to a smooth suspension, treated with 3.65 N hydrochloric acid (352 ml., 1.28 mole), and heated to a gentle reflux. The hot mixture is treated with cyanamide (64.6 g., 1.54 mole) and refluxed for three hours. The product starts to precipitate after thirty minutes. Another charge of cyanamide (64.6 g., 1.54 mole) is added and followed immediately with concentrated (12 N) hydrochloric acid (106 ml., 1.28 mole), and the mixture is refluxed for another three hours. After cooling to 20° C. the mixture is treated with concentrated aqueous ammonia (192 ml., 3.07 mole), with moderate stirring to avoid creaming the solid. It is then cooled to 10° C., filtered, and washed with ethanol. The air-dried free base weighs 270 g., M.P. 300° C.

The crude product is dissolved in a mixture of 35% 2-propanol (2.4 liters) and concentrated hydrochloric acid (144 ml.). The hot solution is treated with charcoal (24 g.), filtered rapidly over Celite (a diatomaceous earth) and the charcoal cake is washed three times with 50 ml. portions of hot 35% 2-propanol. After aging for two hours at 10° C. the product is removed by vacuum filtration, packed as dry as possible, washed with dry 35% 2-propanol, and then with petroleum ether. The product is dried with forced air on the funnel (protected from dust) at room temperature for one and one-half hours. The 3 - amino-6-chloropyrazinamidoguanidine hydrochloride monohydrate weighs 269 g. which is 74% of the theoretical amount based on the weight of hydrazide charged, M.P. 275° C. (dec.).

*Analysis.*—Calculated for $C_6H_{11}Cl_2N_7O_2$: C, 25.36; H, 3.90; N, 34.51; Cl, 24.96; ionic Cl, 12.48. Found: C, 25.56; H, 3.74; N, 34.38; Cl, 25.06; ionic Cl, 12.45.

If dried in an oven at 50° C. under vacuum for several hours, the 3-amino-6-chloropyrazinamidoguanidine is no longer hydrated; however, the hydrate again forms if the hydrochloride salt is allowed to stand in the room for some time.

EXAMPLE 2

*(3-amino-6-chloropyrazinamido)guanidine hydrochloride*

A paste of 3-amino-6-chloropyrazinoic acid hydrazide, from Example 1, Step B (0.133 mole) and ethyl alcohol (400 ml.) is placed into a 1 liter, round-bottom flask. Hydrochloric acid (44 ml. of a 10% solution) is added and the mixture is heated to reflux on a steam bath. Cyanamide (6.8 g., 0.16 mole) dissolved in absolute ethanol (25 ml.) is added, and the mixture is refluxed for 5 hours. More cyanamide (6.8 g., 0.16 mole) and hydrochloric acid (11 ml. of a 36% solution) are added, and reflux is continued for 15 hours. The flask is then fitted with a mechanical stirrer and the solution is cooled to 10° C. with rapid stirring. Ammonia (20 ml. of a 15 N solution) is added, and stirring and cooling are continued for 15 minutes, whereupon a yellow solid precipitates. This is filtered, pressed dry with a rubber dam, and finally treated with 10% hydrochloric acid solution (30 ml.) and cooled to 0–5° C. 3-amino-6-chloropyrazinamidoguanidine hydrochloride precipitates as a yellow solid. After recrystallization twice from 3:7 aqueous 2-propanol, there is obtained 23.5 g. (66%) of product, M.P. 277–278° C. (dec.).

EXAMPLE 3

*(3-amino-6-chloropyrazinamido)guanidine hydrochloride*

A slurry of 10 g. of 3-amino-6-chloropyrazinoic acid hydrazide from Example 1, Step B (10 g., 0.0536 mole), ethanol (180 ml.) and 5.83 N hydrochloric acid (9.2 ml., 0.0536 mole) is heated to reflux. The mixture is then treated with a 50% solution of cyanamide having a specific gravity of 1.06 (5.24 ml., 0.645 mole) and refluxed for three hours. A second addition of the 50% cyanamide solution (5.24 ml., 0.645 mole) is followed with concentrated hydrochloric acid (4.47 ml.) and the mixture is refluxed for another three hours. The 3-amino-6-chloropyrazinamidoguanidine hydrochloride hydrate is recovered and purified following the procedure of Example 1, Step C. The yield of pure product is 74%.

EXAMPLE 4

*(3-amino-6-chloropyrazinamido)guanidine hydrochloride*

A paste of 3-amino-6-chloropyrazinoic acid hydrazide, from Example 1, Sep B (0.133 mole) and ethyl alcohol (400 ml.) is placed into a 1 liter, round-bottom flask. Hydrochloric acid (44 ml. of a 10% solution) is added and the mixture is heated to reflux on a steam bath. Calcium cyanamide (12.8 g., 0.16 mole) is added, and the mixture is refluxed for 5 hours. More calcium cyanamide (12.8 g., 0.16 mole) and hydrochloric acid (11 ml. of a 36% solution) are added, and reflux is continued for 15 hours. The flask is then fitted with a mechanical stirrer and the solution is cooled to 10° C. with rapid stirring. Ammonia (20 ml. of a 15 N solution) is added, and stirring and cooling are continued for 15 minutes, whereupon a yellow solid precipitates. This is filtered, pressed dry with a rubber dam, and finally treated with 10% hydrochloric acid solution (30 ml.) and cooled to 0–5° C. 3-amino-6-chloropyrazinamidoguanidine hydrochloride hydrate precipitates as a yellow solid which is purified by recrystallization from 3:7 aqueous 2-propanol.

EXAMPLE 5

*1-(3-amino-6-chloropyrazinamido)-3-methylguanidine hydrochloride*

A paste of 3-amino-6-chloropyrazinoic hydrazide, prepared from Example 1, Step B (0.133 mole) and ethyl alcohol (400 ml.) is placed into a 1 liter, round-bottom flask. Hydrochloric acid (44 ml. of a 10% solution) is added and the mixture is heated to reflux on a steam bath. Methylcyanamide (8.9 g., 0.16 mole), dissolved in absolute ethanol (25 ml.) is added, and the mixture is refluxed for 5 hours. More methylcyanamide (8.9 g., 0.16 mole) and hydrochloric acid (11 ml. of a 36% solution) are added, and reflux is continued for 15 hours. The flask is then fitted with a mechanical stirrer and the solution is cooled to 10° C. with rapid stirring. Ammonia (20 ml. of a 15 N solution) is added, and stirring and cooling are continued for 15 minutes, whereupon a yellow solid precipitates. This is filtered, pressed dry with a rubber dam, treated with 10% hydrochloric acid solution (30 ml.) and cooled to 0–5° C. The 1-(3-amino-6-chloropyrazinamido)-3-methylguanidine hydrochloride which separates, is removed by filtration and recrystallized from a 7:3 mixture of a 2-propanol and water, M.P. 252–253° C. (dec.).

*Analysis.*—Calculated for $C_7H_{11}Cl_2N_7O$: C, 30.01; H, 3.96; N, 35.01. Found: C, 30.26; H, 4.13; N, 34.88.

EXAMPLE 6

*1-(3-amino-6-chloropyrazinamido)-3,3-dimethylguanidine hydrochloride*

3-amino-6-chloropyrazinoic acid hydrazide (9.4 g., 0.05 mole) from Example 1, Step B is mixed with absolute ethyl alcohol (160 ml.) and 10% aqueous hydrochloric acid solution (20 ml.) in a 500 ml. round-bottomed flask. This mixture is heated on a steam bath, and dimethylcyanamide (3.9 g., 0.055 mole) is added. The mixture then is refluxed for 17 hours. Another charge of dimethylcyanamide (3.9 g., 0.055 mole) and concentrated hydrochloric acid (5 ml.) is added and refluxing is continued for another four hours. The reaction mixture is cooled to 0–5° C. and made basic by the addition of concentrated ammonium hydroxide (10 ml.). Upon standing for 15 minutes at 5° C., a yellow solid precipitates. This material is removed by filtration, dissolved in 10% hydrochloric acid (1 ml.), and cooled to 0–5° C. 1-(3-amino-6-chloropyrazinamido)guanidine hydrochloride precipitates as a yellow solid. It is recrystallized from a mixture of 2-propanol (8 ml.) and water (2 ml.). The yield is 1 g. (7.5%), M.P. 279–280° (dec.).

*Analysis.*—Calculated for $C_8H_{13}Cl_2N_7O$: C, 32.66; H, 4.45; N, 33.34. Found: C, 32.75; H, 4.44; N, 33.13.

EXAMPLE 7

(3,5-diamino-6-chloropyrazinamido)guanidine hydrochloride

*Step A: Preparation of methyl 3,5-diamino-6-chloropyrazinoate.*—In a 2-liter, 3-necked flask fitted with a mechanical stirrer, thermometer and gas inlet tube is placed dry dimethyl sulfoxide (1 liter). Methyl 3-amino-5,6-dichloropyrazinoate (100 g., 0.45 mole) from Example 8, Step A is added and the mixture stirred and heated at 65° C. on a steam bath until solution is effected. A stream of dry ammonia gas is admitted to the solution, with continuous stirring, over a period of 45 minutes while the temperature is maintained at 65–70° C. The solution is cooled to about 10° C. with stirring and ammonia gas is admitted for an additional 1¼ hours. The yellow reaction mixture is poured, with stirring, into cold water (2 liters) and the light yellow solid that separates is removed by filtration and thoroughly washed with water, and dried in a vacuum desiccator, to give 82.5 g. (91%) of methyl 3,5-diamino-6-chlorpyrazinoate, M.P. 210–212° C. Recrystallization from acetonitrile gives material melting at 212–213° C.

*Analysis.*—Calculated for $C_6H_7ClN_4O_2$: C, 35.57; H, 3.48; N, 27.65. Found: C, 35.80; H, 3.38; N, 28.01.

*Step B: Preparation of 3,5-diamino-6-chloropyrazinoic acid hydraxide.*—Methyl-3,5-diamino-6-chloropyrazinoate (1.68 g., 8.28 millimole) and ethanol (34 ml.) are placed in a round-bottomed flask, fitted with a reflux condenser, and refluxed on a steam bath. As soon as the ester dissolves, hydrazine (5.7 ml.) is added and refluxing is continued for 2 hours. After refluxing for about 5 minutes product separates from the reaction mixture. At the end of the heating period the mixture is chilled to 0° C. and the product is filtered, washed well with cold ethanol, and with ethyl ether. The product is dried under vacuum to give 1.54 g. of 3,5-diamino-6-chloropyrazinoic acid hydrazide, M.P. 266–267° C.

*Step C: Preparation of (3,5-diamino-6-chloropyrazinamido)guanidine hydrochloride.*—A mixture of 3,5-diamino-6-chloropyrazinoic acid hydrazide (0.1 g., 0.005 mole) and ethanol (16 ml.) is stirred to a smooth suspension, treated with 4.05 N hydrochloric acid (1.23 ml., 0.005 mole), and heated to reflux. Water (16 ml.) is added in small portions until a clear solution is obtained. Crystalline cyanamide (250 mg., 0.006 mole) is added and the reaction mixture refluxed for 1½ hours. Hydrochloric acid (1.25 ml. of 4.03 N) is added and then another charge of crystalline cyanamide (250 mg.) and the mixture is refluxed for another 1½ hours. A third addition of 4.03 N hydrochloride (1.25 ml.) and cyanamide (250 mg.) is made, followed by refluxing for 1½ hours. After cooling to 20° C. the mixture is treated with concentrated aqueous ammonia, with moderate stirring. The mixture is then cooled to 10° C., filtered, and washed with ethanol to give (3,5-diamino-6-chloropyrazinamido)-guanidine hydrochloride, M.P. 281–282° C. (dec).

*Analysis.*—Calculated for $C_6H_9ClN_8O$: C, 29.45; H, 3.71; N, 45.81. Found: C, 29.46; H, 3.96; N, 45.96.

EXAMPLE 8

(3-amino-5-dimethylamino-6-chloropyrazinamido)guanidine hydrochloride

*Step A: Preparation of methyl 3-amino-5,6-dichloropyrazinoate.*—Methyl 3-aminopyrazinoate (765 g., 5 mole) is suspended in 5 liters of dry benzene. While stirring under anhydrous conditions, sulfuryl chloride (1.99 liters, 3318 g., 24.58 moles) is added over a period of 30 minutes and stirring is continued for 1 hour. During this period, the temperature rises to about 50° C. and then begins to drop. The mixture is heated cautiously to reflux (60° C.), refluxed for 5 hours and then stirred overnight at room temperature. The excess sulfuryl chloride is removed by distillation at atmospheric pressure (distillation is stopped when vapor temperature reaches 78° C.). The dark red mixture is chilled to 6° C. The crystals are removed by filtration, washed by displacement with cold (8° C.) benzene (two 100 ml. portions), then washed with petroleum ether (300 ml.) and dried in vacuo at room temperature, yielding 888 g. (80%) of methyl 3-amino-5,6-dichloropyrazinoate in the form of red crystals, M.P. 228–230° C. The crude product is dissolved in boiling acetonitrile (56 liters) and passed through a heated (70–80° C.) column of decolorizing charcoal (444 g.). The column is washed with hot acetonitrile (25 liters), the combined eluates concentrated in vacuo to about 6 liters and chilled to 5° C. The crystals that form are removed by filtration, washed three times with cold acetonitrile, and air dried to constant weight. The yield is 724 g. (82% recovery, 66% overall) of methyl 3-amino-5,6-dichloropyrazinoate in the form of yellow crystals, M.P. 230–234° C. After additional recrystallizations from acetonitrile the product melts at 233–234° C.

*Analysis.*—Calculated for $C_6H_5Cl_2N_3O_2$: C, 32.46; H, 2.27; N, 18.93; Cl, 31.94. Found: C, 32.83; H, 2.35; N, 19.12; Cl, 31.94.

*Step B: Preparation of methyl 3-amino-5-dimethylamino-6-chloropyrazinoate.*—In a 5-liter, 3-necked flask equipped with a mechanical stirrer and reflux condenser protected with a drying tube is placed methyl 3-amino-5,6-dichloropyrazinoate (178 g., 0.8 mole) and isopropyl alcohol (1.1 liters). While stirring, the suspension is treated with dimethylamine (200 g., 4.44 moles) in isopropyl alcohol (2 liters) and the mixture then is refluxed for one hour. The solution is cooled in an ice bath and the crystalline product that separates is removed by filtration and dried. The yield of methyl 3-amino-5-dimethylamino-6-chloropyrazinoate is 177.2 g. (97%), M.P. 145–146.5° C. Recrystallization from methanol gives material melting at 145.5–146.5° C.

*Analysis.*—Calculated for $C_8H_{11}ClN_4O_2$: C, 41.66; H, 4.81; N, 24.29. Found: C, 41.73; H, 4.52; N, 24.24.

*Step C: Preparation of 3-amino-5-dimethylamino-6-chloropyrazinoic acid hydrazide.*—Methyl 3-amino-5-dimethylamino-6-chloropyrazinoate, (94 g., 0.50 mole) and absolute ethanol (2.2 liters) are placed in a 3 liter, round-bottom flask, fitted with a reflux condenser and refluxed on a steam bath. As soon as the ester dissolves, hydrazine (32 g., 1.0 mole) is added to the solution and refluxing continued 2 hours. After refluxing for about ten minutes the major portion of the product separates from the reaction mixture. At the end of the heating period the mixture is chilled to 0° C. and the product filtered, washed well with cold ethanol and dried, to give 3-amino-5-dimethylamino-6-chloropyrazinoic acid hydrazide, which is purified by recrystallization.

*Step D: Preparation of (3-amino-5-dimethylamino-6-chloropyrazinamido)guanidine hydrochloride.*—A mixture of 3-amino-5-dimethylamino-6-chloropyrazinoic acid hydrazide (280 g., 1.28 mole) and 4 liters of ethanol is stirred to a smooth suspension treated with 3.65 N hydrochloric acid (352 ml., 1.28 mole), and heated to a gentle reflux. The hot mixture is treated with cyanamide (64.6 g., 1.54 mole) and refluxed for three hours. The product starts to precipitate after thirty minutes. Another charge of cyanamide (64.6 g., 1.54 mole) is added and followed immediately with concentrated (12 N) hydrochloric acid (106 ml., 1.28 mole) and the mixture is refluxed for another three hours. After cooling to 20° C., the mixture is treated with concentrated aqueous ammonia (192 ml., 3.07 mole), with moderate stirring to avoid creaming the solid. It is then cooled to 10° C., filtered and washed with ethanol.

The solid is dried and washed with acetonitrile to give (3 - amino-5-dimethylamino-6-chloropyrazinamido)guanidine, M.P. 221° C.

*Analysis.*—Calculated for $C_8H_{13}ClN_5O$: C, 35.23; H, 4.80; N, 41.09; Cl, 13.00. Found: C, 34.73; H, 4.87; N, 41.36; Cl, 13.08.

The crude product is dissolved in a mixture of 35% 2-propanol (2.4 liters) and concentrated hydrochloric acid (144 ml.). The hot solution is treated with charcoal (24 g.), filtered rapidly over Celite (a diatomaceous earth), and the charcoal cake is washed three times with 50 ml. portions of hot 35% 2-propanol. After aging for two hours at 10° C., the product is removed by vacuum filtration, packed as dry as possible, washed with 35% 2-propanol, and then with petroleum ether. The product is dried with forced air on the funnel (protected from dust) at room temperature for one and one-half hours to obtain the (3-amino-5-dimethylamino-6-chloropyrazinamido)guanidine hydrochloride.

While the above examples describe the preparation of certain compounds which are illustrative of the novel compounds of this invention, it is to be understood that the invention is not to be limited to the specific compounds described in the examples or by the specific reaction conditions described for the preparation of these compounds or by the specific ingredients included in the pharmaceutical preparations, but is to be understood to embrace variations and modifications thereof which fall within the scope of the appended claims.

What is claimed is:

1. The process for making pyrazinamidoguanidine which comprises mixing together at a pH of about 3 to 5

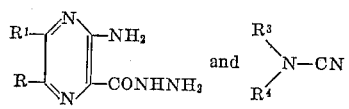

wherein
R is halo;
$R^1$ is selected from the group consisting of hydrogen, amino, lower alkylamino and diloweralkylamino; and
$R^3$ and $R^4$ are independently selected from the group consisting of hydrogen and lower alkyl, phenyl, and phenyl-lower alkyl.

2. The process of claim 1 wherein the reaction is carried out in a lower alkanol solvent which is present in about 5 to 10 parts by weight for each part of the hydrazide at a temperature within the range of about 40–200° C.

3. The process for making pyrazinamidoguanidines which comprises mixing together under reaction conditions:

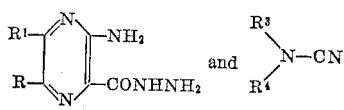

wherein
R is selected from the group consisting of
  hydrogen,
  lower alkyl,
  lower cycloalkyl,
  mononuclear-aryl, trihalomethyl and
  halo,
$R^1$ is selected from the group consisting of
  hydrogen, and
  amino having the structure

wherein
  $R^5$ is selected from the group consisting of hydrogen and a lower alkyl, and
  $R^6$ is selected from the group consisting of
    hydrogen,
    lower alkoxy,
    lower alkyl, and
    aryl,
$R^3$ and $R^4$ are independently selected from the group consisting of
  hydrogen,
  lower alkyl,
  phenyl,
  phenyl-lower-alkyl,
  (halo-phenyl)-lower alkyl,
  lower-(alkylphenalkyl), and
  (lower-alkoxyphenyl)-lower alkyl.

4. The process of making 3-amino-6-chloropyrazinamidoguanidine which comprises the reaction of 3-amino-6-chloropyrazinoic acid hydrazide and cyanamide at a pH within the range of about 3 to 5.

5. The process of making (3-amino-5-dimethylamino-6-chloropyrazinamido)guanidine which comprises the reaction of 3-amino-5-dimethylamino-6-chloropyrazinoic acid hydrazide and cyanamide at a pH within the range of 3 to 5.

6. The process of making (3,5-diamino-6-chloropyrazinamido)guanidine which comprises the reaction of 3,5-diamino-6-chloropyrazinoic acid hydrazide and cyanamide at a pH within the range of 3 to 5.

7. The process of making 1-(3-amino-6-chloropyrazinamido)-3-methylguanidine which comprises the reaction of 3-amino-6-chloropyrazinoic acid hydrazide and methyl cyanamide at a pH within the range of 3 to 5.

References Cited

UNITED STATES PATENTS 2,959,616  11/1960  Birtwell _____ 260—564

NICHOLAS S. RIZZO, *Primary Examiner.*
HENRY R. JILES, *Examiner.*